United States Patent
Freude et al.

(10) Patent No.: US 11,821,508 B2
(45) Date of Patent: Nov. 21, 2023

(54) TEMPERATURE CONTROL DEVICE FOR DRIVE AND/OR TRANSMISSION UNITS SUCH AS TUNNEL BORER TRANSMISSIONS

(71) Applicant: Liebherr-Components Biberach GmbH, Biberach an der Riss (DE)

(72) Inventors: Philipp Freude, Maselheim (DE); Johannes Bulling, Bad Waldsee (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 14 days.

(21) Appl. No.: 17/447,125

(22) Filed: Sep. 8, 2021

(65) Prior Publication Data
US 2021/0396137 A1 Dec. 23, 2021

Related U.S. Application Data

(63) Continuation of application No. PCT/EP2020/055024, filed on Feb. 26, 2020.

(30) Foreign Application Priority Data

Mar. 8, 2019 (DE) .................... 20 2019 101 298.6
Apr. 3, 2019 (DE) .................... 20 2019 101 918.2

(51) Int. Cl.
*F16H 57/04* (2010.01)
*E21D 9/10* (2006.01)
(Continued)

(52) U.S. Cl.
CPC ....... *F16H 57/0417* (2013.01); *E21D 9/1086* (2013.01); *F16H 1/46* (2013.01); *F16H 57/08* (2013.01)

(58) Field of Classification Search
CPC .... F16H 1/46; F16H 57/0415; F16H 57/0417; F16H 57/0421; F16H 57/0423; F16H 57/08; E21D 9/1086
See application file for complete search history.

(56) References Cited

U.S. PATENT DOCUMENTS 3,362,162 A    1/1968  Willmer
4,100,821 A *  7/1978  Geiger .................. F16H 57/021
                                              184/6.12
(Continued)

FOREIGN PATENT DOCUMENTS

CN    101 285 519 A    10/2008
CN    101793149        8/2010
(Continued)

OTHER PUBLICATIONS

Machine translation of JP 2011-214586 A obtained on Feb. 14, 2023.*
(Continued)

*Primary Examiner* — Adam D Rogers
(74) *Attorney, Agent, or Firm* — Levine Bagade Han LLP

(57) ABSTRACT

The cooling and/or heating of drive and/or transmission units of construction machines and similar equipment is disclosed. A temperature control device can cool and/or heat such drive and/or transmission units. The temperature control device can include a heat exchanger module having a liquid jacket through which flow is possible. The heat exchanger module can form a ring body for fitting in a sandwich-like manner between two transmission and/or drive sections. The ring body can have a central through-cutout for a drive element to pass through and can have on each opposite end face a connection flange for precision-fit end-face connection to the two transmission and/or drive sections.

20 Claims, 2 Drawing Sheets

(51) Int. Cl.
*F16H 1/46* (2006.01)
*F16H 57/08* (2006.01)

(56) References Cited

U.S. PATENT DOCUMENTS

| | | | |
|---|---|---|---|
| 6,257,368 B1 * | 7/2001 | Young | F16H 57/0469 |
| | | | 384/473 |
| 8,992,368 B2 * | 3/2015 | Terauchi | E02F 9/123 |
| | | | 475/5 |
| 2013/0231210 A1 | 9/2013 | Terauchi et al. | |

FOREIGN PATENT DOCUMENTS

| | | | | |
|---|---|---|---|---|
| CN | 109114210 A | * | 1/2019 | ......... F16H 57/0412 |
| CN | 113357354 A | * | 9/2021 | |
| DE | 102007049599 | | 5/2009 | |
| DE | 102015214330 | | 2/2017 | |
| JP | 2011-214586 | | 10/2011 | |
| JP | 2014-156710 | | 8/2014 | |
| JP | 2016-166639 | | 9/2016 | |
| WO | WO-2012070205 A1 | * | 5/2012 | ............. E02F 9/123 |
| WO | WO 2014/069536 | | 5/2014 | |
| WO | WO-2017194322 A1 | * | 11/2017 | ............... F16H 3/66 |
| WO | WO 2020/182469 | | 9/2020 | |

OTHER PUBLICATIONS

Machine translation of WO 2017/194322 A1 obtained on Feb. 15, 2023.*

Machine translation of WO 2014/069536 A1 A obtained on Feb. 15, 2023.*

* cited by examiner

TEMPERATURE CONTROL DEVICE FOR DRIVE AND/OR TRANSMISSION UNITS SUCH AS TUNNEL BORER TRANSMISSIONS

CROSS-REFERENCE TO RELATED APPLICATIONS

This application is a continuation of International Patent Application Number PCT/EP2020/055024 filed Feb. 26, 2020, which claims priority to German Patent Application Numbers DE 20 2019 101 298.6 filed Mar. 8, 2019 and DE 20 2019 101 918.2 filed Apr. 3, 2019, all of which are incorporated herein by reference in their entireties.

BACKGROUND

The present invention relates generally to the cooling and/or heating of drive and/or transmission units of construction machines and similar equipment. The invention relates to the temperature control device for cooling and/or heating such a drive and/or transmission unit with at least one heat exchanger module having a liquid jacket through which flow is possible. The invention also relates to a drive and/or transmission unit having at least two transmission and/or drive sections, which are cooled and/or heated by such a temperature control unit. The invention further relates to a tunnel boring machine, the transmission of which is cooled and/or heated by such a temperature control device.

In the case of construction machinery the drives of which are continuously running over a longer period of time, the transmissions and, in some cases, the adjoining drive sections are exposed to high thermal loads, making pure air cooling simply insufficient to dissipate such amounts of heat. It is therefore common practice to cool the drive motors and transmissions with water, oil or another coolant. In this regard, such liquid cooling can be found in different configurations. For example, it has been proposed that the transmission be cooled via the end face with which the transmission is connected to the drive motor by integrating a water flow in the motor flange for cooling, so that transmission heat can be discharged via the end face of the transmission connected to the motor. While in itself it would suffice for shorter or single-stage transmissions, in the case of axially longer designs having a plurality of gear stages, as commonly used in tunnel boring machines, for example, this type of end-face cooling of the transmission does not dissipate sufficient heat and, in particular, affects the overheating of gear stages arranged axially further away from the end face.

To ensure comprehensive cooling specifically of the transmission, it has also already been proposed to lead the transmission oil out of the transmission in a circuit, cool it outside and then feed it back again. Nevertheless, such a circulation of the transmission oil by way of outside cooling requires quite a lot of effort and is subject to numerous constraints as far as circulation speed and pressure are concerned so that sufficient and thorough lubrication of all transmission elements were achieved on an ongoing basis.

Although indeed, this is frequently an issue of the drive and/or transmission unit being cooled, for very cold ambient conditions, for example when the boring machine is idle overnight or over the weekend in practically arctic conditions, it may also be necessary or at least helpful to heat the drive and/or transmission unit and bring it to an operating temperature, for example to facilitate the start-up and to ensure thorough lubrication also during start-up amid very cold temperatures.

It is therefore the underlying object of the present invention to provide an improved temperature control device of the type specified hereinabove, as well as an improved drive and/or transmission unit and an improved tunnel boring machine, which overcome the disadvantages of the prior art and advantageously further develop the latter. What is particularly aimed at is a robust temperature control system that can withstand even severe on-site conditions, using a simply constructed, easily replaceable device that can, if necessary, also be retrofitted to the drive and/or transmission units in the case of which, under certain operating conditions, there has come to temperature related problems.

SUMMARY

Said task is solved, according to the invention, with a temperature control device as claimed in claim 1, a transmission and/or drive unit as claimed in claim 11, and a tunnel boring machine as claimed in claim 14. Preferred embodiments of the invention are the subject-matter of the dependent claims.

It is therefore proposed to configure the temperature control device in the form of an independent heat exchanger module, separate from the transmission, which can be fitted in a sandwich-like manner between two transmission and/or drive sections in order to extract or introduce heat at the intersection of the two transmission and/or drive sections. Thanks to the modular design of the transmission and/or drive unit on the one hand and the temperature control device on the other, a transmission and/or drive unit can also be retrofitted in a fairly simple manner if temperature problems occur. According to the invention, the at least one heat exchanger module of the temperature control device forms a ring body for fitting in a sandwich-like manner between two transmission and/or drive sections, said ring body having a central through-cutout for a drive element to be guided through and has, on each opposite end face, a connection flange for precision-fit end-face connection to the two transmission and/or drive sections. A driveshaft, for example, or a driving wheel or another driving element which connects, for example, two gear stages or two transmission sections and/or drive sections in a force-transmitting or torque-transmitting manner can be guided through said through-cutout. In this way, the heat exchanger module can be integrated into the drive or transmission unit in a simple manner without having to adapt the transmission or drive unit in any special way. The opposite connection flanges of the ring body of the heat exchanger are adapted in shape to the flange pattern of the transmission and/or drive sections to be connected, so that the transmission or drive sections can be precision-fit and connected to the connection flanges.

In particular, the transmission and/or drive sections between which the heat exchanger module is to be fitted in a sandwich-like manner can be connected in a fluid-tight manner to the connection flanges of the heat exchanger, wherein said transmission and/or drive sections can be attached to the opposite connection flanges of the heat exchanger module, in particular by means of respective housing parts.

The opposing connection flanges of the ring body of the heat exchanger module can be conformally and fluid-tightly attached to the rim-side connection flanges of the two housing parts, said housing parts together forming a transmission housing and/or forming separate housing components of separate gear stages.

In a further embodiment of the invention, the liquid jacket of the heat exchanger module through which flow is possible may form a ring chamber inside the ring body which extends around the through-cutout. Such a ring chamber surrounding the through-cutout allows the cooling liquid to flow around the through-cutout and cool the walls of the ring body over a large area, accommodating and discharging correspondingly high amounts of heat.

In order to achieve a robust and at the same time efficient configuration in terms of heat transfer, said ring body can, in a further development of the invention, comprise a solid outer ring to which the two opposing connection flanges are attached, an inner ring incorporated within the outer ring, and two preferably plate-shaped end walls that interconnect said outer and inner rings and delimit between them the liquid jacket, in particular said ring chamber.

Such a solid outer ring, which may be configured as a solid body of a metallic material, for example, provides the heat exchanger module with sufficient robustness to stably connect the two transmission and/or drive sections to each other and also to protect the heat exchanger module itself against the harsh environmental conditions at a construction site. At the same time, the modular design with the plate-shaped end walls connecting the inner and outer rings and delimiting the liquid jacket achieves an overall simple structure, with the end walls forming large heat transfer surfaces capable of transferring high amounts of heat to the liquid flowing through them.

In order to achieve an overall lightweight configuration, said end walls can have significantly smaller wall thicknesses than the solid outer ring. For example, as end walls there can be provided thin sheet metal plates, which can be firmly welded and/or glued to the solid outer ring and to the inner ring, for example, and/or cast on during casting or attached in another manner in a fluid-tight manner. In an advantageous further embodiment of the invention, the wall thickness of the plate-shaped end walls may be less than one third or even less than one quarter of the thickness of the outer ring, in particular of the axial extension of the outer ring.

Regardless of the wall thickness of the plate-shaped end walls, the inner ring can also have a significantly smaller wall thickness than the outer ring. For example, the radially measured thickness of the inner ring may be less than 50% of the radially measured thickness of the outer ring, and the inner and outer rings may have equal axial extents, particularly when the plate-shaped end walls are arranged parallel to each other.

Considered as a whole, the heat exchanger formed as a ring body may be disc-shaped, in particular in the manner of a salami sliced form having a through-hole in the center. Such a disc-shaped configuration of the ring body can be characterized, for example, by at least approximately parallel end faces. Independently thereof, the outer and/or inner circumferential surface of the ring body, which may be formed by the outer circumferential side of the outer ring and/or the inner circumferential side of the inner ring, may have an approximately cylindrical contour, in particular an approximately circular cylindrical contour.

Advantageously, the liquid jacket of the heat exchanger module can have an inlet and an outlet in order to be able to cool or, if necessary, also heat the temperature control liquid flowing through externally, i.e. outside the heat exchanger module or its liquid chamber. In particular, the heat exchanger module may have at least one inflow connection and one outflow connection to allow an external cooling fluid circuit of the respective machine to be connected to the heat exchanger module in a simple manner with the corresponding inflow and outflow lines.

Advantageously, said inlet and outlet connections may be provided on the outer ring of the ring body of the heat exchanger module to allow the temperature control liquid to be supplied to and discharged from the ring chamber through the outer ring.

Advantageously, said inlet and said outlet of the ring chamber may be provided side by side or in the same sector of the ring body of the heat exchanger and may be separated from each other by a separation plate provided in the ring chamber, which divides the ring chamber into two ring regions in the circumferential direction in the manner of a slit ring. The arrangement of the inlet and outlet in the same sector of the ring body or ring chamber ensures that the temperature control liquid flows and is recirculated through the entire ring chamber, wherein said separation plate prevents a flow short circuit and ensures that the liquid must flow in a circuit through the entire heat exchanger or ring chamber.

Said inlet and outlet connections may include fluid-tight coupling means, such as plug-in couplings or screw couplings for connecting temperature control liquid lines.

Advantageously, said inlet and said outlet may be arranged at the top of the ring body, for example at just before and just after 12 o'clock, in order to supply the temperature control liquid at the top as well as to discharge it at the top. Such an arrangement of the inlet and outlet of the temperature control liquid circuit on the upper side ensures that the entire liquid jacket, in particular the entire ring chamber is flowed through by the temperature control liquid. In an advantageous further development of the invention, there can be provided turbulence fins and/or flow distributing plates in said ring chamber through which the temperature control liquid flows, in particular arranged radially offset from one another, so that the temperature control liquid must flow back and forth in a meandering or winding manner in order to be able to pass the turbulence fins. If, in the manner specified, the ring chamber is delimited by an inner ring and an outer ring, said turbulence fins may be arranged to project alternately outwards from the inner ring and inwards from the outer ring. Said turbulence fins can extend over the entire width or thickness of the ring chamber, i.e. they can adjoin the two plate-shaped end walls on both sides, so that only one passage remains at the radially inner end or at the radially outer end of the alternately arranged turbulence fins.

Alternatively or additionally, however, it is also possible to arrange the turbulence fins in such a way that the cooling or heating liquid flows back and forth in a meandering manner between the two plate-shaped end walls which delimit the ring chamber at the end. To achieve this, said turbulence fins can each leave a passage gap to pass through to one of the two end walls, with the turbulence fins alternating between one end wall and the other end wall.

Yet a meandering flow path, going back and forth from the inner ring to the outer ring and so on, extends the flow path through the ring chamber and accordingly the holding time of the circulating temperature control liquid in the ring chamber, whereby an improved heat transfer can be achieved.

Advantageously, in order to achieve a homogenization of the temperature of the two transmission and/or drive sections separated from each other by the heat exchanger module, the heat exchanger module may have a plurality of through-cutouts in the region of an outer peripheral portion of the ring body. In particular, said outer ring may be provided with a plurality of through holes or through-cutouts to allow exchange of transmission oil or lubricant from one transmission and/or drive section to the other transmission and/or drive section, even in the region close to the transmission and/or drive casing wall. If, for example, in one of the transmission sections there is provided a planetary gear stage, said planetary gear stage having ring gear on the outer circumference, then the lubricant that has been forced out of the teeth in the hollow space can escape through said through holes, so that when it comes into direct contact with the heat exchanger module, the forced-out oil will release heat and overheating in the area of the ring gear is avoided.

Said through holes may be arranged along the circumference of the heat exchanger module.

Said through through-cutouts may be positioned radially within opposing connection flanges.

In a further embodiment of the invention, gear stages may be provided on both sides of the heat exchanger module, preferably in the form of planetary gear stages. The two gear stages can be connected to each other in a force-transmitting and torque-transmitting manner by a sun gear and/or a planet carrier bar, which extends through the through-cutout of the ring-shaped heat exchanger module.

In a further embodiment of the invention, the at least one heat exchanger module can be arranged between the first two gear stages positioned closest to the drive motor in order to be able to discharge the heat load occurring there. Especially in the first, fast rotating gear stages, the power losses and thus the heat generated are greatest, so that the heat load can be reduced particularly efficiently by interposing the heat exchanger module between the first two transmission stages.

In a further embodiment of the invention, a plurality of heat exchanger modules of said type may also be arranged between a plurality of adjacent pairs of gear stages, for example between the first and second gear stages and between the second and third gear stages. Said gear stages can advantageously each be configured as a planetary gear stage.

In principle, it would also be possible to arrange a heat exchanger module between the first gear stage and the drive motor connected thereto. One of the connection flanges of the ring body of the heat exchanger module can be attached to the drive motor housing and the other drive flange can be attached to the transmission housing and thus connected in a liquid-tight manner.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
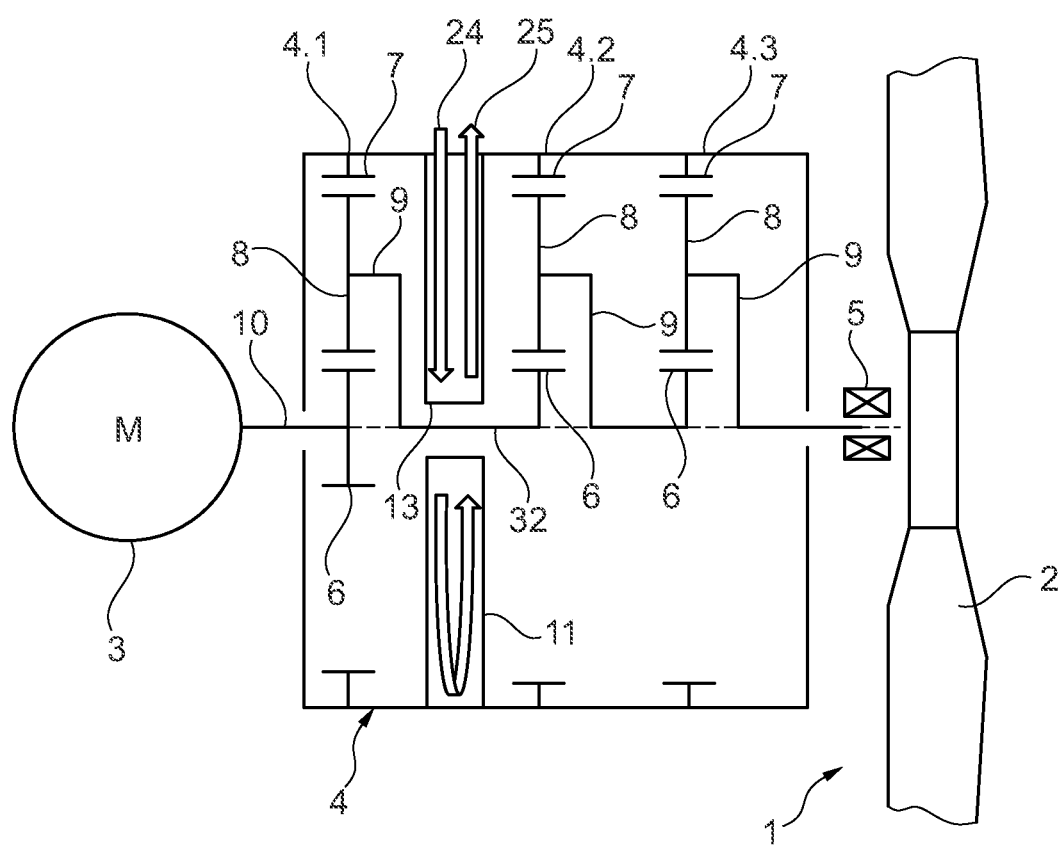
FIG. 1: a schematic representation of the drive and transmission unit of a tunnel boring machine, wherein the transmission comprises a plurality of planetary gear stages and a heat exchanger module is arranged between a first and a second gear stage according to an advantageous embodiment of the invention.

As shown in FIG. 1, a tunnel boring machine 1 may have a rotatably drivable boring head 2 similar to a milling rotor, which is rotatably driven by a drive motor 3 via a transmission unit 4. Said drill head 2 can thereby be driven, for example, via a toothed ring by the transmission unit 4, which can be supported in a commonly known manner by a drill head bearing 5.

As shown in FIG. 1, the transmission unit 4 can be made up of several gear stages which are connected in series in order to translate or reduce the drive speed of the drive motor 3 into the desired rotor speed of the drill head 2, wherein, for example, three transmission stages 4.1, 4.2 and 4.3 can be provided.

Said gear stages may be planetary stages, each of which may comprise a sun gear 6, a ring gear 7 and planet gears 8 in mesh therewith, which may be arranged on a planet carrier 9. In this case, adjacent planetary stages can be connected to each other at the sun gear and at the planet carrier bar, cf. FIG. 1.

Said gear stages 4.1, 4.2 and 4.3 may each be configured separately from one another and each have at least approximately cylindrical transmission housing parts by means of which they can be placed against one another, so that the transmission unit 4 as a whole is constructed in a modular manner from the plurality of gear stages which are arranged axially one behind the other and are connected to one another.

The first gear stage 4.1 may be connected to the drive motor 3, wherein, for example, a motor output shaft 10 may be non-rotatably coupled to the sun gear 4 of the first gear stage 4.1. The output shaft of the last gear stage 4.3, for example the planet carrier bar 9, can be coupled to the drive shaft of the drilling rotor 2, for example via a toothed ring.

As shown in FIG. 1, a heat exchanger module 11 can be inserted between two adjacent gear stages, in particular between the relatively fast rotating first and second gear stages 4.1 and 4.2, which is fitted in a sandwich-like manner between the end faces of the adjacent gear stages 4.1 and 4.2. Said heat exchanger module 11 may thereby rigidly connect the housing parts of the first and second gear stages 4.1 and 4.2 to each other, for example by means of a screw bolt connection which clamps the two housing parts 12.1 and 12.2 against the heat exchanger module 11.

Figure 2:
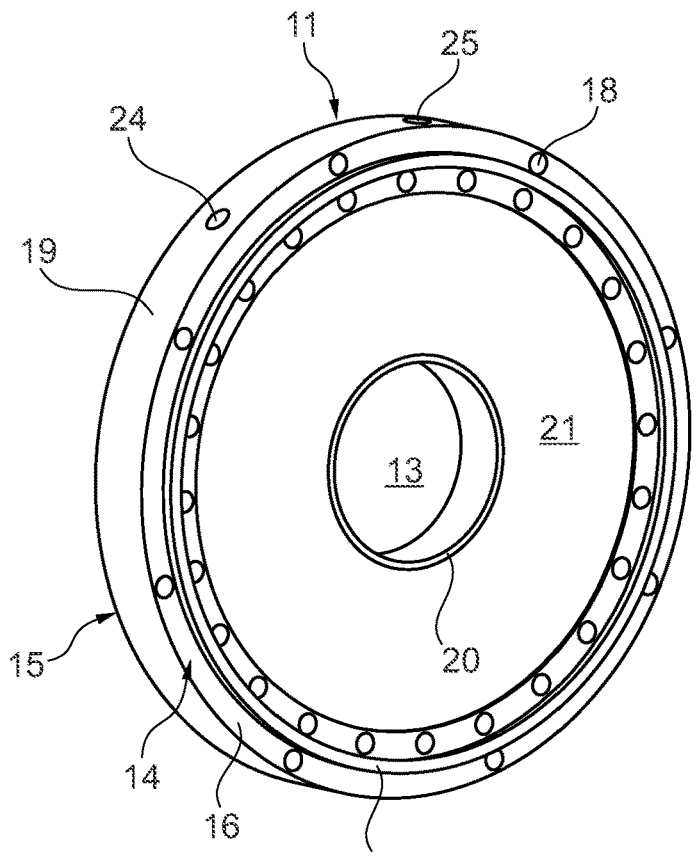
FIG. 2: a perspective representation of the disc-shaped heat exchanger module of the drive and transmission unit of FIG. 1, and FIG. 3: a perspective, in part cut-away view of the disc-shaped heat exchanger module of FIG. 2, showing the interior of the ring chamber through which the flow can pass and the turbulence fins arranged thereon.
Figure 3:
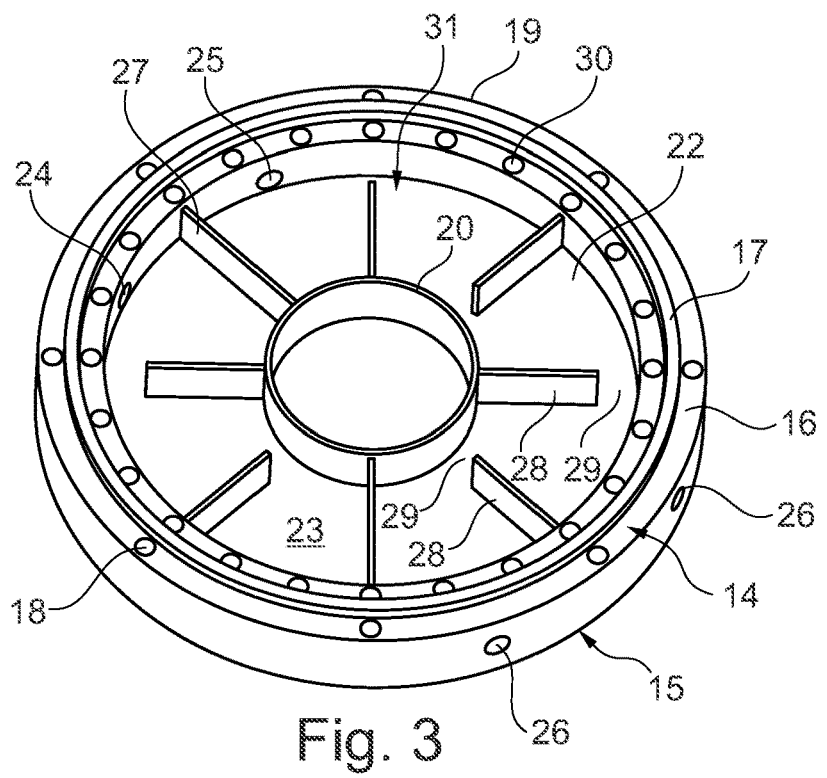

Said heat exchanger module 11 is shown in more detail in FIGS. 2 and 3, and may be disc-shaped when viewed as a whole. In particular, the heat exchanger module 11 can form a ring body which has a through-cutout 13 in a central section and has, on opposite end faces, a respective connection flange 14 and 15 which are adapted in terms of shape and dimensions to the connection flange of the two gear stages 4.1 and 4.2, so that said gear stages 4.1 and 4.2 can be precision-fit on the two connection flanges 14 and 15 of the heat exchanger module 11 and can thus be connected preferably without a gap, in particular in a liquid-tight manner. For example, as shown in FIGS. 2 and 3, said connection flanges 14 and 15 may each have a flat annular end face 16 which may extend approximately parallel to each other and/or in planes perpendicular to the longitudinal axis of the transmission unit. Said end faces 16 of the connection flanges 14 and 15 can be delimited at an inner edge, but if necessary also at an outer edge, by an annular web 17 projecting at the end face, said annular web 17 being able to slide into the housing part 12.1 or 12.2 of the adjacent transmission section 4.1 and 4.2 and, for example, precision-fit against the inner circumferential surface of the respective housing part. By means of said annular web 17, the heat exchanger module 11 can be guided in a radially precise way on the housing parts 12.1 and 12.2 of the adjacent transmission sections.

In order to be able to rigidly connect the gear stages 4.1 and 4.2 to the heat exchanger module 11, bores 18 may be provided in the heat exchanger module 11 in the region of the connection flange 14 and 15 in order to be able to connect the two housing parts 12.1 and 12.2 to the heat exchanger module 11, for example by means of screw bolts. The bolts may extend through said bores 18.

As shown in FIG. 3, the heat exchanger module 11 can advantageously comprise a solid outer ring 19 made of solid material, on the end faces of which said connection flanges 14 and 15 can be configured.

Within said outer ring 19, the heat exchanger module 11 may include an inner ring 20 defining said through-cutout 13 of the heat exchanger module 11. Said outer and inner rings 19, 20 may be interconnected by two plate-like end walls 21, 22 which define a ring chamber 23 between themselves and said inner and outer rings. Said end walls 21 and 22 may, for example, be made of a thin metal sheet or other highly thermally conductive material.

Independently thereof, said end walls 21 and 22 may be arranged parallel to each other and spaced from each other by a dimension approximately equal to the axial width of the inner ring 20 and/or the outer ring 19.

Said end walls 21 and 22 may be substantially planar, in particular forming two planar annular discs.

Said end walls 21 and 22 are connected to the outer and inner rings 19, 20 in a fluid-tight manner, for example welded and/or glued.

In order to be able to circulate temperature control liquid through the ring chamber 23, said ring chamber 23 has an inlet 24 and an outlet 25 which can advantageously extend through the outer ring 19 and can advantageously open at the outer circumference of said outer ring 19.

As shown in FIG. 2, the inlet 24 and outlet 25 can advantageously be arranged adjacent to each other and/or in the same sector of the outer ring 19, in particular on an upper side of the heat exchanger module 11 when this is integrated in the transmission unit 4 as intended.

In addition to said inlets and outlets 24 and 25, one or more further outlets 26 can be provided on the underside of the ring chamber 23 in order to be able to drain the cooling liquid from the ring chamber 23, wherein these outlets 26 can advantageously also extend through the outer ring 19, cf. FIG. 3.

In order to ensure that the temperature control liquid flows through the entire ring chamber 23, a separation plate 27 may be provided in the ring chamber 23 between the inlet 24 and outlet 25 provided at the top, which divides the annular chamber 23 between the inlet 24 and outlet 25 in the manner of a slit ring. Said separation plate 27 may be connected in a fluid-tight manner to both the outer ring 19 and the inner ring 20, as well as to the two spaced-apart end walls 21 and 22.

The inlet 24 thus opens into the annular chamber 23 on one side of the separation plate 27, while the outlet 25 opens into the ring chamber 23 on the opposite side of the separation plate 27.

Further, in order to direct the temperature control liquid into all regions of the ring chamber 23 as it flows through the ring chamber 23, turbulence fins 28 may be provided in the ring chamber 23 and may be arranged and configured such that the fluid flowing circumferentially through the ring chamber 23 meanders back and forth between the inner ring 20 and the outer ring 19 or flows back and forth in a winding manner along the direction of circulation. Said turbulence fins 28 may be alternately radially offset from one another, and may alternately leave a gap with the inner ring 20 and a gap with the outer ring 19 for the passage of the temperature control liquid therethrough.

Independently thereof, said turbulence fins 28 may extend between and interconnect said two end walls 21 and 22, said turbulence fins 28 extending at least approximately in the radial direction or from the inside to the outside, that is, in the direction from the inner ring to the outer ring or vice versa.

In particular, said turbulence fins 28 may alternately connect once to the inner ring 20 and once to the outer ring 19, leaving a gap 29 to the other ring through which the temperature control liquid may flow. Said gaps 29 are arranged alternately on the outer ring 19 and on the inner ring 20, cf. FIG. 3.

The heat exchanger module 11 described has significant advantages. On the one hand, this is a cost-effective and very robust structure that is also suitable for tough operating conditions such as those encountered in a tunnel boring machine. The solid outer ring in particular can also withstand the impact loads that occur in tunnel boring machines.

Not only the solid outer ring 19, but also the modular design, according to which the end walls 21 and 22 are connected to each other several times by the outer and inner rings as well as the turbulence fins, makes the structure very stable, so that no damage occurs even in the case of strong vibrations, pressure peaks or other external impacts. The heat exchanger module is integrated directly into the transmission unit 4 and is thus also additionally protected from external impacts.

The arrangement of the heat exchanger module 11 between the first two gear stages 4.1 and 4.2 also results in excellent incident flow conditions, with a double effective area being created by the two end walls 21 and 22 being in contact with the gear lubricant of both gear stages. The power loss is absorbed in the immediate vicinity of the point of origin. Especially in the first high-speed gear stages 4.1 and 4.2, the power losses and thus the heat generated are greatest.

Due to the radial, staggered arrangement of the turbulence plates or fins 28, the temperature control liquid circulating annularly around the through-cutout 13 is deflected several times, which ensures an integral flow around and maximum utilization of the heat transfer surface by a turbulent flow depending on the flow rate.

The heat exchanger module 11 is easy to adapt to existing transmission designs. In this case, the heat exchanger module 11 can be easily placed between the planetary stages of the transmission unit 4, if required.

Due to the modular design, several heat exchanger modules 11 can also be connected in series and thus the cooling capacity can be increased almost as required.

The axial through holes 30 or through-cutouts, which pass through the heat exchanger module 11 in the axial direction, allow oil forced out of the tooth flanks to flow through the through holes 30 at the level of the ring gears 7 of the planetary gear stages and to experience a direct cooling effect. Said through-cutouts 30 also facilitate oil exchange or lubricant exchange in the transmission unit 4, and ensure uniform mixing of the lubricant.

We claim:

1. A temperature control device for cooling and/or heating a tunnel borer transmission, the temperature control device comprising:
   a heat exchanger module having a liquid jacket and radially mutually offset turbulence fins in a ring chamber, wherein the heat exchanger module comprises a ring body for fitting in a sandwich-like manner between two adjacent drive and/or transmission sections, wherein the ring body has a central through-cutout for the guiding of a rotatable drive and/or transmission element, wherein the ring body has on opposite end faces a connection flange such that the ring body comprises two opposite connection flanges for end-face connection to the two adjacent transmission and/or drive sections, and wherein the radially mutually offset turbulence fins alternately project outwardly from an inner circumference of the ring chamber and inwardly from an outer circumference of the ring chamber, and alternately define at the inner circumference and at the outer circumference of the ring chamber a passage gap for a temperature control liquid to be circulated.

2. The temperature control device of claim 1, wherein the liquid jacket forms the ring chamber inside the ring body extending around the central through-cutout.

3. The temperature control device of claim 2, wherein the ring chamber has at least one inlet and at least one outlet which are adjacent to one another and/or in a sector of the ring chamber and are separated from one another by a separation plate, and wherein the separation plate divides the ring chamber in the circumferential direction into two ring chamber sections.

4. The temperature control device of claim 3, wherein the at least one inlet and the at least one outlet are on an upper side of the heat exchanger module.

5. The temperature control device of claim 1, wherein the ring body has a solid outer ring on which the two opposite connection flanges are configured, an inner ring arranged inside the solid outer ring, and two flat end walls which connect the solid outer ring and the inner ring to one another and delimit the liquid jacket between them.

6. The temperature control device of claim 5, wherein a wall thickness of each of the two flat end walls is less than one third of a wall thickness of the solid outer ring.

7. The temperature control device of claim 6, wherein the radially mutually offset turbulence fins are connected to both of the two flat end walls and are alternately connected to either the inner ring or the solid outer ring.

8. The temperature control device of claim 5, wherein a wall thickness of each of the two flat end walls is less than one quarter of a wall thickness of the solid outer ring.

9. The temperature control device of claim 1, wherein an outer ring has axial through-cutouts within the two opposite connection flanges for flow connection of the two adjacent transmission and/or drive sections, between which the heat exchanger module is arranged in a sandwich-like manner.

10. The temperature control device of claim 9, wherein the radially mutually offset turbulence fins are connected to both of the two flat end walls and are alternately connected to either an inner ring or the outer ring.

11. The temperature control device of claim 1, wherein the two adjacent drive and/or transmission sections are attached to the two opposite connection flanges and are connected to one another by the heat exchanger module, wherein the rotatable drive and/or transmission element extends through the central through-cutout, and wherein the rotatable drive and/or transmission element connects the two adjacent drive and/or transmission sections to one another in a force-transmitting and/or torque-transmitting manner.

12. The temperature control device of claim 11, wherein one of the two adjacent transmission and/or drive sections connected to the heat exchanger module comprises a first planetary gear stage, wherein the other of the two adjacent transmission and/or drive sections connected to the heat exchanger module comprises a second planetary gear stage, and wherein the rotatable drive and/or transmission element connects a sun gear of the first planetary gear stage to a planet carrier of the second planetary gear stage in a rotationally fixed manner.

13. The temperature control device of claim 12, wherein the heat exchanger module is arranged between the first planetary gear stage and the second planetary gear stage, and wherein the first planetary gear stage and the second planetary gear stage are connected in series to a drive motor and/or are the two gear stages with the highest speeds.

14. The temperature control device of claim 11, wherein the heat exchanger module is arranged between a first gear stage and a second gear stage, and wherein the first gear stage and the second gear stage are connected in series to a drive motor and/or are the two gear stages with the highest speeds.

15. The temperature control device of claim 1, wherein the heat exchanger module is integrated into a transmission unit of the tunnel borer transmission, and wherein a drill head is configured to be driven by a drive motor via the transmission unit.

16. A temperature control device for cooling and/or heating a tunnel borer transmission, the temperature control device comprising:
   a heat exchanger module having a liquid jacket,
   wherein the heat exchanger module comprises a ring body for fitting in a sandwich-like manner between two adjacent drive and/or transmission sections,
   wherein the ring body has a central through-cutout for the guiding of a rotatable drive and/or transmission element,
   wherein the ring body has on opposite end faces a connection flange such that the ring body comprises two opposite connection flanges for end-face connection to the two adjacent transmission and/or drive sections, and
   wherein the ring body has a solid outer ring on which the two opposite connection flanges are configured, an inner ring arranged inside the solid outer ring, and two flat end walls which connect the solid outer ring and the inner ring to one another and delimit the liquid jacket between them.

17. The temperature control device of claim 16, wherein a wall thickness of each of the two flat end walls is less than one third or one quarter of a wall thickness of the solid outer ring.

18. The temperature control device of claim 17, wherein turbulence fins are connected to both of the two flat end walls and are alternately connected to either the inner ring or the solid outer ring.

19. A temperature control device for cooling and/or heating a tunnel borer transmission, the temperature control device comprising:
   a heat exchanger module having a liquid jacket,
   wherein the heat exchanger module comprises a ring body for fitting in a sandwich-like manner between two adjacent drive and/or transmission sections,
   wherein the ring body has a central through-cutout for the guiding of a rotatable drive and/or transmission element,
   wherein the ring body has on opposite end faces a connection flange such that the ring body comprises two opposite connection flanges for end-face connection to the two adjacent transmission and/or drive sections, and wherein an outer ring has axial through-cutouts within the two opposite connection flanges for flow connection of the two adjacent transmission and/or drive sections, between which the heat exchanger module is arranged in a sandwich-like manner.

20. The temperature control device of claim 19, wherein turbulence fins are connected to both of two flat end walls and are alternately connected to either an inner ring or the outer ring.

* * * * *